US011853291B2

(12) United States Patent
De Caro et al.

(10) Patent No.: US 11,853,291 B2
(45) Date of Patent: Dec. 26, 2023

(54) PRIVACY PRESERVING ARCHITECTURE FOR PERMISSIONED BLOCKCHAINS

(71) Applicant: International Business Machines Corporation, Armonk, NY (US)

(72) Inventors: Angelo De Caro, Zurich (CH); Christian Gorenflo, Waterloo (CA); Kaoutar El Khiyaoui, Zurich (CH); Elli Androulaki, Zurich (CH); Alessandro Sorniotti, Zurich (CH); Marko Vukolic, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 16/920,844

(22) Filed: Jul. 6, 2020

(65) Prior Publication Data
US 2022/0004539 A1    Jan. 6, 2022

(51) Int. Cl.
G06F 16/00    (2019.01)
G06F 16/23    (2019.01)
G06F 16/27    (2019.01)
H04L 9/06     (2006.01)
(Continued)

(52) U.S. Cl.
CPC .......... *G06F 16/2379* (2019.01); *G06F 16/27* (2019.01); *G06F 21/6245* (2013.01); *H04L 9/0637* (2013.01); *H04L 9/0643* (2013.01); *H04L 9/50* (2022.05)

(58) Field of Classification Search
None
See application file for complete search history.

(56) References Cited

U.S. PATENT DOCUMENTS

| 10,878,415 | B1* | 12/2020 | Yang | G06N 20/10 |
| 2017/0132619 | A1* | 5/2017 | Miller | H04L 9/30 |
| 2017/0230189 | A1* | 8/2017 | Toll | G06F 21/54 |

(Continued)

FOREIGN PATENT DOCUMENTS

| CN | 104408584 B | 3/2015 |
| CN | 107103054 B | 3/2019 |

(Continued)

OTHER PUBLICATIONS

Amiri, M., et al., "On Sharding Permissioned Blockchains," Published in 2019. 4 pages. Published by IEEE. Atlanta, GA, USA.

(Continued)

*Primary Examiner* — Hasanul Mobin
(74) *Attorney, Agent, or Firm* — Jared Montanaro; Heather Johnston

(57) ABSTRACT

In some embodiments, a processor may generate a request associated with a transaction, collect an anchor associated with the request, and transition the transaction into a collection of two or more hashes; the processor may submit the transaction to an ordering service. In some embodiments, a processor may receive a request associated with a transaction, identify that a first preimage associated with a first hash is known to a first shard, and generate a first identification tag associated with the transaction. In some embodiments, a processor may receive a request associated with a transaction, assign a first shard a first task, and identify that a first preimage associated with a first hash is known to the first shard; the processor may perform the task.

25 Claims, 11 Drawing Sheets

(51) Int. Cl.
    *G06F 21/62*     (2013.01)
    *H04L 9/00*     (2022.01)

(56) References Cited

U.S. PATENT DOCUMENTS

| | | | |
|---|---|---|---|
| 2018/0101448 A1* | 4/2018 | Ventura | G06F 11/1458 |
| 2018/0101848 A1 | 4/2018 | Castagna | |
| 2018/0300382 A1* | 10/2018 | Madisetti | H04L 9/0637 |
| 2018/0341930 A1* | 11/2018 | Moir | H04L 9/3239 |
| 2019/0244195 A1* | 8/2019 | Ma | H04L 9/0637 |
| 2019/0286838 A1* | 9/2019 | Wang | G06F 21/54 |
| 2020/0099534 A1* | 3/2020 | Lowagie | H04L 9/3247 |
| 2020/0409906 A1* | 12/2020 | Liu | G06F 16/137 |
| 2021/0273807 A1* | 9/2021 | Wertheim | G06F 9/466 |
| 2021/0366586 A1* | 11/2021 | Ryan | G06Q 20/3224 |

FOREIGN PATENT DOCUMENTS

| | | | | |
|---|---|---|---|---|
| WO | 2019207504 A1 | 10/2019 | | |
| WO | WO-2020098818 A3 * | 9/2020 | | G06F 16/22 |
| WO | 2022008996 A1 | 1/2022 | | |

OTHER PUBLICATIONS

Androulaki, E., et al., "Channels: Horizontal Scaling and Confidentiality on Permissioned Blockchains." Published Aug. 8, 2018. 18 pages. vol. 11098, LNCS. Published by Springer.

Grace Period Disclosure. Decaro, et al., "TNG—Private Transactions, "Published Jan. 20, 2020. 12 pages. Published in ACM Symposium on Principles of Distributed Computing.

Feng, Q., et al., "A Survey on Privacy Protection in Blockchain System." Published Nov. 2018. Accessed Mar. 30, 2020. 5 pages. Published by ResearchGate. https://www.researchgate.net/publication/328919824_A_survey_on_privacy_protection_in_blockchain_system.

Mell et al., "The NIST Definition of Cloud Computing," Recommendations of the National Institute of Standards and Technology, U.S. Department of Commerce, Special Publication 800-145, Sep. 2011, 7 pgs.

International Search Report and Written Opinion, International application No. PCT/IB2021/055197, International filing date Jun. 14, 2021.

* cited by examiner

PRIVACY PRESERVING ARCHITECTURE FOR PERMISSIONED BLOCKCHAINS

STATEMENT REGARDING PRIOR DISCLOSURES BY THE INVENTOR OR A JOINT INVENTOR

The following grace period disclosure is submitted under 35 U.S.C. 102(b)(1)(A): Christian Gorenflo, Angelo De Caro, Kaoutar El Khiyaoui, Elli Androulaki, Alessandro Sorniotti, and Marko Vukolić, "TNG-Private Transactions," 12 pages.

BACKGROUND

The present disclosure relates generally to the field of blockchain transaction commitment, and more specifically to preserving privacy of a transaction in a permissioned blockchain.

Blockchains offer immutability of data by replicating data across all nodes of a network. In order to be able to validate the blockchain, nodes must have access to the complete history of transactions, which any data on the chain is visible for all participants.

SUMMARY

Embodiments of the present disclosure include a method, system, and computer program product for processing a private transaction in a blockchain network. A processor may generate a request associated with a transaction. The processor may collect an anchor associated with the request. The processor may transition the transaction into a collection of two or more hashes. The processor may submit the transaction to an ordering service.

Further embodiments of the present disclosure include a method for processing a private transaction in a blockchain network. A processor may receive a request associated with a transaction. The processor may identify that a first preimage associated with a first hash is known to a first shard. The processor may generate a first identification tag associated with the transaction.

Further embodiments of the present disclosure include a method for processing a private transaction in a blockchain network. A processor may receive a request associated with a transaction. The processor may assign a first shard a first task. The processor may identify that a first preimage associated with a first hash is known to the first shard. The processor may perform the task.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
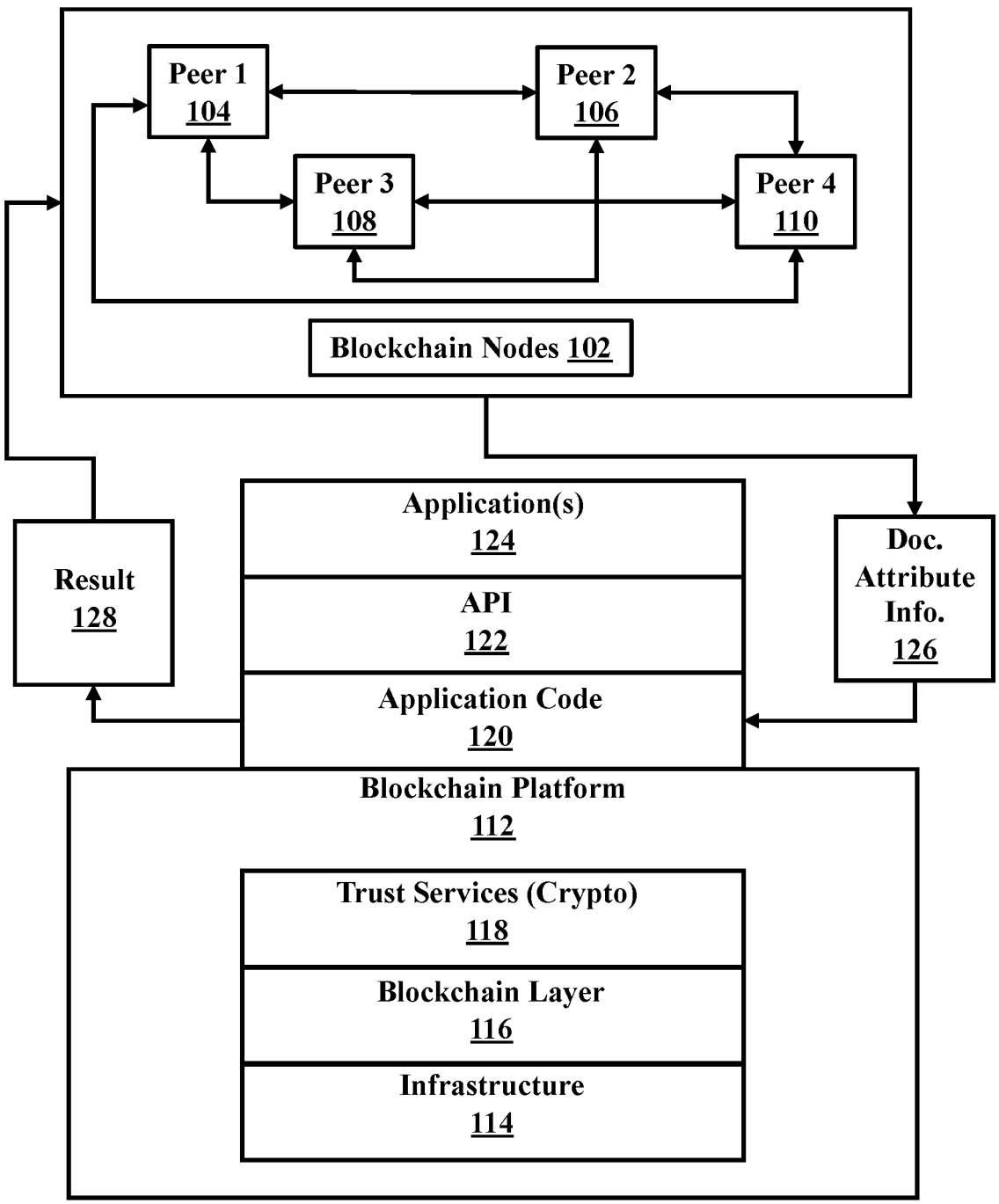
FIG. 1A illustrates an example blockchain architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of blockchain transaction commitment, and more specifically to preserving privacy of a transaction in a permissioned blockchain. Embodiments described address blockchain privacy concerns by redesigning a blockchain framework around a privacy-first approach, which does not rely on expensive (e.g., computing costs, resource costs, etc.) cryptographic primitives. Disclosed herein are methods, systems, and computer program products that allow for a modular transaction execution environment, ordering service, and internal data storage. Poignant contributions to the art/field of blockchain to be discussed are: a novel shard-based blockchain framework with fast atomic inter-shard transaction; a domain-driven transaction creation that is independent of an underlying data management system; and a privacy-preserving non-blocking atomic commitment protocol.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide for a privacy-preserving attribute-based document sharing in blockchain networks.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method and system for a privacy-preserving attribute-based document sharing in blockchain networks. The exemplary embodiments solve the issues of time and trust by extending features of a database such as immutability, digital signatures and being a single source of truth. The exemplary embodiments provide a solution for a privacy-preserving attribute-based document sharing in blockchain networks. The blockchain networks may be homogenous based on the asset type and rules that govern the assets based on the smart contracts.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system for a privacy-preserving attribute-based document sharing in blockchain networks is implemented due to immutable accountability, security, privacy, permitted decentralization, availability of smart contracts, endorsements and accessibility that are inherent and unique to blockchain. In particular, the blockchain ledger data is immutable and that provides for an efficient method for privacy-preserving attribute-based document sharing in blockchain networks. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of processing a private transaction in a blockchain network.

One of the benefits of the example embodiments is that it improves the functionality of a computing system by implementing a method for processing a private transaction in a blockchain network. Through the blockchain system described herein, a computing system (or a processor in the computing system) can perform functionality for private transaction processing utilizing blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a business network of users and on-board/off-board organizations to collaborate and execute service processes in the form of smart contracts.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

Meanwhile, a traditional database could not be used to implement the example embodiments because it does not bring all parties on the business network, it does not create trusted collaboration and does not provide for an efficient storage of digital assets. The traditional database does not provide for a tamper proof storage and does not provide for preservation of the digital assets being stored. Thus, the proposed embodiments described herein utilizing blockchain networks cannot be implemented in the traditional database.

Meanwhile, if a traditional database were to be used to implement the example embodiments, the example embodiments would have suffered from unnecessary drawbacks such as search capability, lack of security and slow speed of transactions. Accordingly, the example embodiments provide for a specific solution to a problem in the arts/field of privacy preserving processing.

The example embodiments also change how data may be stored within a block structure of the blockchain. For example, a digital asset data may be securely stored within a certain portion of the data block (e.g., within header, data segment, or metadata). By storing the digital asset data within data blocks of a blockchain, the digital asset data may be appended to an immutable blockchain ledger through a hash-linked chain of blocks. In some embodiments, the data block may be different than a traditional data block by having a personal data associated with the digital asset not stored together with the assets within a traditional block structure of a blockchain. By removing the personal data associated with the digital asset, the blockchain can provide the benefit of anonymity based on immutable accountability and security.

Continuing, a blockchain document processor may have two components: a private off-chain processor that manages secure processing of private information related to a participant; and a ledger processor that manages processing of common information shared with all participants of a blockchain network using the consensus algorithm of the network.

According to the exemplary embodiments, each of the organizations that intend to share documents with other organizations uses a blockchain document processor connected to a blockchain network. Using the document processor, the organizations may set up the following on the ledger: a list of document templates (such as archived cloud storage proposals, etc.); attributes of each document template that will be shared in hashed form on the ledger; a combination of key attributes from different templates for matching and sharing documents; and partnership Merkle trees: each partnership Merkle tree may be built based on partnering organizations' (e.g., proposing entities') identifiers (IDs).

In some embodiments, all documents (e.g., files, etc.) are stored on the off-chain data store (e.g., the cloud server, datacenter, etc.). Only the preimages, attribute hashes, and/or document identifiers (ID) are submitted as a part of a blockchain transaction. For example, as proposed in the present disclosure, preimages of hashes are stored in specific shards within a blockchain which privately validate a transaction and prevent other shards from viewing information.

FIG. 1A illustrates a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as asset exchange transactions and keep information private.

The blockchain architecture 100 of FIG. 1A may process and execute program/application code 120 via one or more interfaces exposed, and services provided, by blockchain platform 112. The code 120 may control blockchain assets. For example, the code 120 can store and transfer data, and may be executed by peers 104-110 in the form of a smart contract and associated chaincode with conditions or other code elements subject to its execution. As a non-limiting example, smart contracts may be created to execute the generation of storage spaces, the reserving of storage spaces, updates to current proposals, etc. The smart contracts can themselves be used to identify rules associated with authorization and access requirements and usage of the ledger. For example, the document attribute(s) information 126 may be processed by one or more processing entities (e.g., virtual machines) included in the blockchain layer 116. The result 128 may include a plurality of linked shared documents (e.g., with each linked shared document recording the issuance of a smart contract, etc.). The physical infrastructure 114 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus atomically committing a transaction to the blockchain).

Figure 1B:
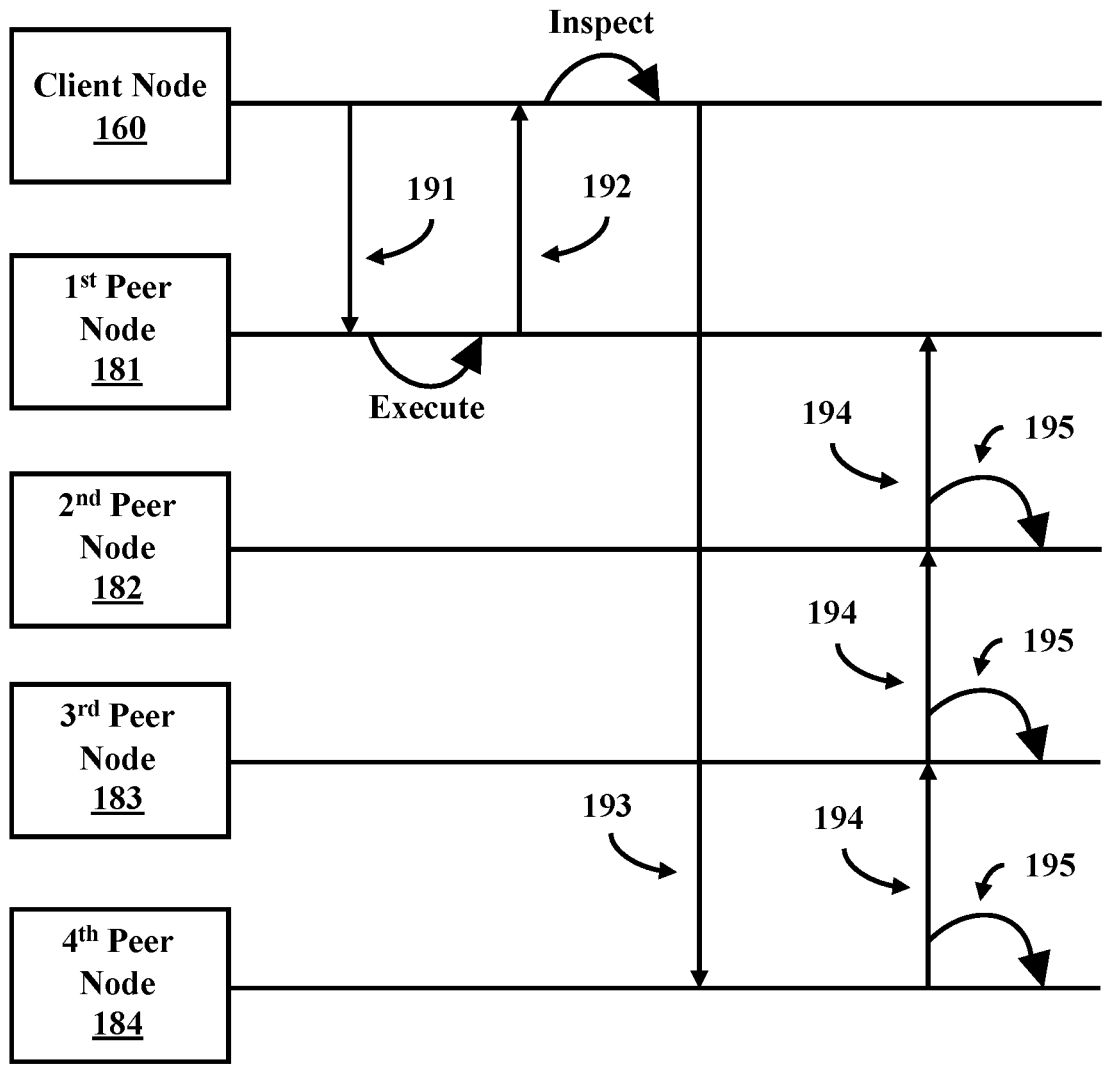
FIG. 1B illustrates a blockchain transactional flow, in accordance with embodiments of the present disclosure.

FIG. 1B illustrates an example of a blockchain transactional flow 150 between nodes of the blockchain in accordance with an example embodiment. Referring to FIG. 1B, the transaction flow may include a transaction proposal 191 sent by an application client node 160 to an endorsing peer node 181 (e.g., in some embodiments, the transaction proposal 191 may be sent for endorsement upon determining a preimage of a hash associated with the transaction proposal 191 matches a saved preimage within a specific shard). The endorsing peer 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client 160 along with an endorsement signature, if approved. The client 160 assembles the endorsements into a transaction payload 193 and broadcasts it to an ordering service node 184. The ordering service node 184 then delivers ordered transactions as blocks to all peers 181-183 on a channel. Before committal to the blockchain, each peer 181-183 may validate the transaction. For example, the peers may check the endorsement policy to ensure that the correct allotment of the specified peers have signed the results and authenticated the signatures against the transaction payload 193.

Referring again to FIG. 1B, the client node 160 initiates the transaction 191 by constructing and sending a request to the peer node 181, which is an endorser. The client 160 may include an application leveraging a supported software development kit (SDK), which utilizes an available API to generate a transaction proposal 191. The proposal is a request to invoke a chaincode function so that data can be read and/or written to the ledger (e.g., write new key value pairs for the assets). The SDK may serve as a shim to package the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read set, and write set. However, no updates are made to the ledger at this point. In 192, the set of values, along with the endorsing peer node's 181 signature is passed back as a proposal response 192 to the SDK of the client 160 which parses the payload for the application to consume.

In response, the application of the client 160 inspects/verifies the endorsing peers signatures and compares the proposal responses to determine if the proposal response is the same. If the chaincode only queried the ledger, the application would inspect the query response and would typically not submit the transaction to the ordering node service 184. If the client application intends to submit the transaction to the ordering node service 184 to update the ledger, the application determines if the specified endorsement policy has been fulfilled before submitting (e.g., did all peer nodes with a specific shard necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 193 the client 160 assembles endorsements into a transaction and broadcasts the transaction proposal 191 and response within a transaction message to the ordering node 184. The transaction may contain the read/write sets, the endorsing peers signatures and a channel ID. The ordering node 184 does not need to inspect the entire content of a transaction in order to perform its operation, instead the ordering node 184 may simply receive transactions from all channels in the network, order them chronologically by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 2A:
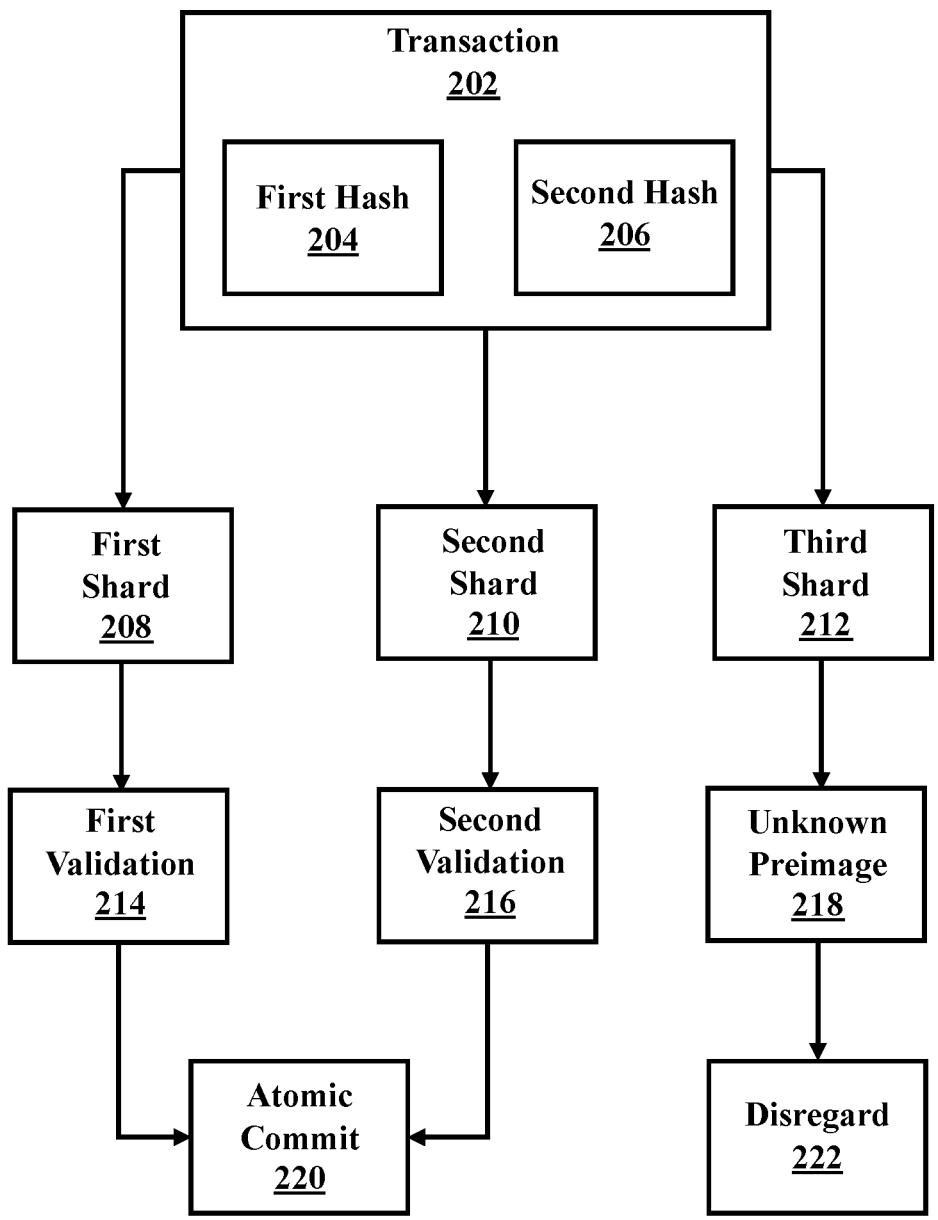
FIG. 2A illustrates a block diagram of an example system for atomically committing a transaction to a blockchain network, in accordance with embodiments of the present disclosure.

Referring now to FIG. 2A, illustrated is a block diagram of an example system 200 for atomically committing a transaction to a blockchain network, in accordance with embodiments of the present disclosure. In some embodiments, the system 200 includes a transaction 202, which includes a first hash 204 and second hash 206. The system 200 further includes a first shard 208, a second shard 210, and a third shard 212. The system continues to include a first validation 214, a second validation 216, an unknown preimage 218, an atomic commit (e.g., command, operation, module, node, etc.) 220, and a disregard (e.g., command, operation, module, node, etc.) 222. In some embodiments, the transaction 202 is sent to the system 200 to be validated and committed by/to the blockchain network. The transaction 202 is split into the first hash 204 and the second hash 206 which have a preimage associated therewith (e.g., not depicted). The preimages of the hashes 204, 206 are then sent to all, one, or any combination of the shards 208-210, which have a copy of either the primage associated with the first hash 204 or the second hash 206.

As depicted, the first shard 208 includes a copy of the preimage associated with the first hash 204, the second shard 210 includes a copy of the preimage associated with the second hash 206, and the third shard 212 does not include a copy of either preimage. In some embodiments, the first shard 208 allows a node/peer that houses/utilizes the first shard 208 to perform the first validation 214; the second shard 210 allows a node/peer that houses/utilizes the second shard 210 to perform the second validation 216. In some embodiments, upon the validations 214, 216, the atomic commit 220 is performed and the transaction is committed to the blockchain network.

In some embodiments, a node/peer that houses/utilized the third shard 212 identifies that an unknown preimage 218 has been sent to the node/peer of the third shard 212 and the unknown preimage 218 is disregarded by the disregard 222. In some embodiments, the atomic commit 220 and the disregard 222 are performed simultaneously. It is noted that what is depicted in the system 200 allows for the committing of a transaction (e.g., the transaction 202) to a blockchain network without exposing information to the entire blockchain network wantonly.

It is further noted that certain assumptions are used in regard to the system 200 (and the systems 230, 250 of FIGS. 2B-C, respectively), the assumptions are detailed below:

All processes running on the network participants and communication between network nodes is partially synchronous. More specifically, for every communication round, there is an upper bound on latency, $\Delta \in [1, \infty)$, measured in number of rounds, for every message sent between two correct nodes;

The hashing function and public key infrastructure (PKI) cannot be intentionally broken. It is noted that the presented network setup discussed herein is permissioned, e.g., all participants are known and have roles assigned to them in a similar fashion to the current implementation of (Hyperledger) Fabric. As such, it is further assumed that communication is point-to-point authenticated, e.g., using transport layer security (TLS);

Every node (loosely corresponding to a peer in Fabric) in the network belongs to at least one privacy shard. While every node replicates the same ledger, it only shares its view of the world state with other nodes in the same privacy shard. The union of all local shard states creates the complete world view. Accordingly, it is further assumed that all nodes and their shard memberships are known to all other nodes in the network. However, nodes do not leak their local state or any information that is not specified by the protocol described herein. Furthermore, while nodes might behave faulty, we assume that shards as a whole are honest, but curious, and do not fail;

Clients are entities interacting with the ledger. They are responsible for initiating transactions. Multiple clients can collaborate to create a transaction together. Each of these clients may be Byzantine faulty. In particular, some or even all involved clients might collude against the rest of the network;

Assets are a collection of data that represent either physical objects or virtual concepts on the ledger. As disclosed herein, assets are first-class citizens and become the primary point of interaction with the blockchain. By modeling them like objects in object-oriented programming such smart assets manage their own data. They track their own internal state and only make public APIs available for interaction. This splits traditional smart contracts into two parts, the asset definition and the business logic based on the interaction between one or more smart assets. Each can be handled by different domain experts, making application development, interoperability and composition of assets easier. The asset definition, e.g., its inner workings and public API are installed on privacy shards. Hereby, different shards can offer different smart asset definitions similar to banks offering varied selections of financial instruments. It is further assumed that all API calls take in data transfer objects (DTOs) that contain all necessary data for the requested state transition. All DTOs and the asset itself may implement the interfaces GetID( ) and GetStakeholders( ). The first one ensures the ledger can find a previously created asset and the latter is needed to validate stakeholder policies as discussed in the following. It is noted that the method, system, and computer-program product disclosed herein are not limited to assets, but on the contrary are agnostic to the transaction content;

Further assumed, it is required that every asset has a defined set of stakeholders. For example, an IOU asset would require a borrower and a lender as stakeholders. When installing an asset definition, each API may register a stakeholder policy. Whenever a client calls the API, they may provide one or multiple stakeholder signatures satisfying the policy for the function call. For instance, a policy for a withdrawal request from a joint bank account could require 1-out-of-2 stakeholder signatures. Stakeholders are part of the internal state of an asset and can change over time.

From a conceptual view, the existence of stakeholders prevents double spending on ledgers without forks like which is presented herein. Whenever a stakeholder transfers ownership of an asset to a new stakeholder, the asset will not accept the old stakeholder's signature anymore. If a malicious stakeholder tries to create two transfers for the same asset they will eventually appear totally ordered in the global ledger. Then, the first transaction changes the stakeholder, so when the second transaction is validated it violates the stakeholder policy of the asset and is discarded;

A transaction is the semantic unit of simultaneous state transitions and is submitted to the ledger by a client. It can involve multiple privacy shards and intricate dependencies between its different parts. For example, a transaction could consist of three state transitions. The first transition in shard A and the second in shard B depend on each other to commit, thereby ensuring an atomic interaction. The third transition involves shard C, but is independent of the other two parts. This can lead to a situation where A and B discard the transaction, while C commits it. This is allowed behavior, because the correctness of the local state of each shard is preserved and the atomic part of the transaction is consistent as well. If shard C's part is truly independent of A and B, then it should not matter if those get discarded. Otherwise, the third part needs to receive a dependency and would be covered by the atomicity guarantee;

The ordering service is responsible for creating the global order of transactions. Like privacy shards, the ordering service is viewed as a "black box" in the described scenario. As such, the ordering service acts honest but curious. Further, it creates a total order of transactions submitted by clients, cuts this order into blocks and disseminates the blocks to all privacy shards in the network. As described herein and discussed below in more detail, it is unknown, by construction, which shards are involved in a single transaction. Therefore, it is impossible for a global ordering service to disseminate transactions only to involved shards.

Referring back to FIG. 2A, a simplified example is described, for example: one client, Bob, would like to borrow 100 dollars from another client, Alice. For this purpose, they will create an IOU smart asset denoting the borrowed sum on privacy shard which has that asset definition installed. In exchange, Alice will transfer an existing asset worth 100 dollars that is stored in privacy shard Stoken to Bob. These two operations belong to the same transaction and may be executed atomically.

In another example, Alice and Bob negotiate the content of the DTO for the CreateIOU call. As stated before, GetID( ) and GetStakeholders( ) are already implemented, so they only need to ensure they both add their public keys to mark them as stakeholders and agree on the correct value. This negotiation happens completely between the involved clients without the involvement of any shard or ordering service.

Once both Bob and Alice are satisfied with the DTO for the IOU creation, they prepare the request to shard siou. This request consists of the uniquely specified name of the function call, in this case CreateIOU, the corresponding DTO, an arbitrary request ID and a set of shards this request is dependent on. The request ID ensures that a shard receiving this request can differentiate between a malicious/accidental replay of the same request and a true second request that just coincidentally has the same parameters. By adding {stoker} as the dependency set to the request, Alice and Bob can tell Siou that Stoken has to validate another part of the transaction. In this case, Siou will only commit the changes if, and only if, Stoken also commits its changes (which will be described more fully below).

A set of clients that satisfies the stakeholder policy of the function call in the request needs to sign the Merkle root hash of the four parts of the request with the same private key that belongs to their stakeholder public key. The receiving shard later checks if these signatures adhere to the stakeholder policy. For CreateIOU the registered policy on Siou is that both the borrower and lender need to sign the request, so both Alice and Bob add their signatures. Because of these signatures no client can create a valid request that has not been seen by the required amount of stakeholders.

Finally, Bob, who is sending the request to the shard, adds the signature associated with his role in the network to the message (Table 2) to verify that he is allowed to make requests to a shard. An example for such a role would be WRITER, someone who is allowed to create requests and transactions. This last signature is not considered part of the message and will be discarded by the shard after verification, so that no information about the sender of the request can leak to the rest of the network. Due to the request ID, each client signature is tied to a specific request; it cannot be reused by a malicious client without trying to replay the whole request, which can be dealt with by duplicate prevention on the shard.

When the shard Siou receives the request from Bob, it first checks the request for duplication, then it unpacks the payload and validates the signatures against the stakeholder policy of CreateIOU, using the GetStakeholders( ) interface of the DTO to receive the necessary public keys. If this validation is unsuccessful, the shard simply responds with an error message. Otherwise, the next step depends on the configuration of the shard.

In some embodiments, an execution engine of the blockchain is completely decoupled from the transaction flow, so shards could be configured to either do pre-order, or post-order execution, or some mix of the two. If the shard does pre-order execution, it now simulates CreateIOU and stores the result in a local transient store. If the shard is configured to do post-order execution, the resultant payload is empty. Either way, the shard then signs the Merkle root hash of the request (without σrole) and the result payload. This acts as a partial preimage of the future transaction, so the shard may store this locally before returning the response to the client. The shard then only returns the hash of the preimage and its signature. It is noted that the clients do not need to learn the outcome of the request. The hash in the response simply acts as an anchor of the preimage to the transaction.

In some embodiments, the steps provided above may be repeated for all parts of a complete transaction. Therefore, Alice and Bob also have to agree on which asset Alice will transfer to Bob. They create a request to TransferToken with {Siou} as the dependency set. This way, the token transfer only goes through if Siou also commits its part of the transaction. Then, Alice sends the request to Stoken, where that particular asset is held. Afterwards, Stoken loads the asset from its database with the help of the GetID interface of the DTO of the TransferToken request. This way, both the stakeholders of the request and the existing asset can be validated together. In this case, the owner of the asset must also be stakeholder of the transfer. Translating this into a policy gives: "One signature must match both the single stakeholder of the existing asset and one stakeholder of the transfer, the other signature must only match the other stakeholder of the transfer."

In general, multiple requests to different shards can be handled concurrently, because the only link between them is their dependency sets, which is only used during validation after the transaction is submitted. It is noted that none of the involved shards learns what the requests to the other shards are.

In some embodiments, after Alice and Bob receive the responses from shards Siou and Stoken, they collect and hash them before both sign the Merkle root hash with the same private key they used for the individual requests. As with single requests before, Alice attaches a signature associated with her network role and sends the whole transaction to the ordering service.

A transaction consists of the hashes of all shard responses that are involved in that transaction and the signatures of the Merkle root of all involved stake holders. Here we make the distinction between stakeholders and clients, because it is possible that a single client uses different key pairs for each request to a shard. In that case, this client needs to sign the transaction with all the involved private keys. It is important to point out that clients sign the Merkle root without the need for exact knowledge of any response preimages. This allows for partially opaque transactions.

In another example, take a netting scenario between three clients Alice, Bob and Cerise that cyclically owe each other 10 dollars. Alice is willing to cancel the IOU that she has with Bob if simultaneously the IOU Cerise has with her is canceled. Analogously, Bob and Cerise would do the same. However, neither client needs to know the agreement between the other two clients to be sure the netting works for themselves. Therefore, they create a transaction with three parts, with each client only knowing two of the hashed shard responses. It is necessary to combine the three parts of the netting transfer in a single transaction to guarantee atomicity. The clients can still all sign the Merkle root of the transaction, because they are sure that the opaque part of the transaction cannot involve any of their assets. If it were otherwise they would have had to sign the request that lead to the creation of the opaque hash in the transaction. It is noted that transactions can implicitly involve multiple hashed responses from the same shard.

In some embodiments, When the ordering service receives a new transaction, it verifies the client's role, then discards that signature and puts the transaction into a new block, which is then disseminated to the whole network. Due to the ordering service only seeing hashes and signatures associated with unknown public keys, it cannot learn anything about the identity of the clients (except for the sender) or even which privacy shards are involved. However, it can learn the number of involved shards and clients. If this leakage is an issue, clients can add any number of bogus (e.g., false, fake, etc.) hashes and fake signatures to the transaction in the previous step to obscure the true number of participants. Furthermore, a proxy client could be used to broadcast the transaction to the ordering service if the identity of the true sender should be kept secret.

In some embodiments, in the IOU case, both shards Siou and Stoken scan every transaction in each new block they receive. They compare each Merkle leaf of a transaction with the hashes of preimages they have previously created but not yet validated. So, at some point Siou will recognize the hash for the response to the CreateIOU request. To check that the known hash is part of a valid transaction, Siou verifies that all stakeholders of the preimage have also signed the full transaction. If that were not the case, then the transaction could have been created without the knowledge of one of the requests stakeholders.

Assuming Siou is configured to do pre-order execution it already has stored the simulated request result. Because that result could be stale by now, it needs to verify that the result is still valid. If in-stead Siou is configured to do post-order execution it will simulate the result and check validity as previously discussed. In either case, if the result is invalid, it discards the transaction and moves on. If the result is valid, it asks Stoken if it's part of the transaction was valid as well. To this end it sends the Merkle root of the transaction in question to Stoken.

In the meantime, Stoken has done the same, so each will respond to the other shard's inquiry with either a success or failure message. If a shard receives a failure message it discards the local result, even if it was valid. Otherwise, the result will be committed to the local ledger state. This ensures that either both the IOU is created and the token is transferred or neither is.

As a further example, the commit protocol gets more complicated in a scenario with more than two shards. Imagine a scenario with four shards $S_0$, $S_1$, $S_2$, $S_3$. Each shard $S_i$ depends on the result from two shards $S_i-1$ mod 4 and $S_i+1$ mod 4. If $S_1$ is valid and the responses from $S_0$ and $S_2$ are valid as well, it would go ahead and commit. But it could be the case that $s_i$ asked before either of the other shards had a chance to get a response from $S_3$. If $S_3$ is invalid both $S_0$ and $S_2$ would change their result to invalid as well. Therefore, $s_i$ should not have committed its part of the transaction. This means, a variation of atomic commit (AC) across all involved shards should be implemented.

Further, in a case dealing with an ambiguous corner case, a transaction could contain multiple requests to the same shard. In such a case, the validation of computed results in the same order as their associated hashes appear in the transaction is enforced. This order is fixed by the signed Merkle root of the transaction, so the outcome is deterministic as long as the outcome of every single validation is deterministic. Next, it is defined that the response that a shard with multiple requests $S_{multi}$ gives to any dependent shard $S_{dep}$. In some instances, requests cannot be differentiated by $S_{dep}$, because it is not able to connect hashes in the transaction to specific shards. In further instances, $s_{multi}$, does not know for which request $S_{dep}$ would like a response because dependency sets do not necessarily create bidirectional dependencies. Therefore, $S_{multi}$ can only give a single answer to $S_{dep}$. The only way a single response will not break atomicity of any dependent validation is by aggregating all request results in an all-or-nothing manner. So the response by any shard, independent of the number of requests to validate, is the transaction hash that was queried by the other shard and a single SUCCESS or FAILURE.

It is noted that, generally, transactions need to be validated sequentially to ensure determinism. But a shard may be able to reason about transaction dependencies. Especially if the shard uses pre-order execution it can find transactions that only touch distinct states. In such a case, the shard to validate can validate independent transactions in parallel to avoid being completely blocked by a single transaction that is waiting for a response from another shard. However, even if a dependency analysis of transactions is not possible it is guaranteed that all shards make progress eventually under the assumption that there are no permanent network partitions. By the time a transaction is submitted to the ordering service all involved shards have seen their own associated preimages. Otherwise, the shard would not have been able to sign the response to the client's request. If a shard does not recognize a hash in a transaction, this hash either belongs to a different shard or it is an invalid hash, so, it can be ignored in either case. Therefore, when shards start the atomic commit protocol for a specific transaction, each involved shard can definitely decide its own start value. The delay for commitment is determined by the latest shard to receive the block and the latency of the atomic commit protocol. By assumption all shards are well-behaved, so all will eventually decide.

It is to be emphasized that the present disclosure does not guarantee complete commitment or discarding of a transaction, but only atomicity of dependent parts. Assume a transaction consists of two independent parts. Then, each corresponding shard would verify that the stakeholders of its part are a subset of the complete set of transaction signatures. In this case, the first shard cannot and should not be able to decide if the second shard was able to verify the signatures. Therefore, it is possible that the first shard commits the change while the second shard dismisses it. However, by definition both parts were semantically independent, so this does not lead to any inconsistencies or possible attacks on the global state of the ledger.

Figure 2B:
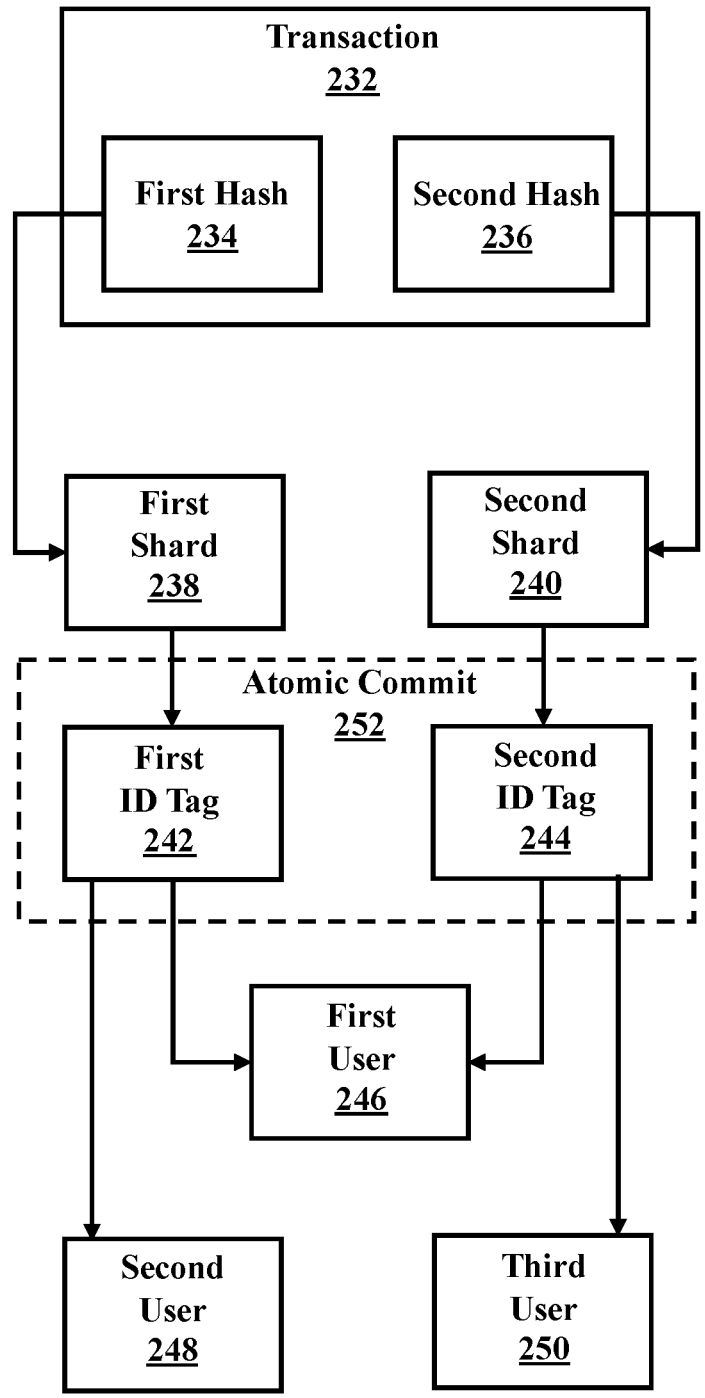
FIG. 2B illustrates a block diagram of an example system for atomically committing a horizontal cut transaction to a blockchain network, in accordance with embodiments of the present disclosure.

Referring now to FIG. 2B, illustrated a block diagram of an example system 230 for atomically committing a horizontal cut transaction to a blockchain network, in accordance with embodiments of the present disclosure. It is noted that various descriptions of the system 230 may utilize scenarios or descriptions described above in regard to system 200 of FIG. 2A.

In some embodiments, the system 230 may include a transaction 232, which is split into a first hash 234 and a second hash 236. In some embodiments, preimages (not shown) of each of the hashes 234, 236 may be sent to either a first shard 238, a second shard 240, or both shards 238, 240. As depicted, but in no way limiting, the first shard 238 identifies that it already retains a matching (same) preimage of the first hash 234 as was sent. Further, the second shard 240 identifies that it already retains a matching preimage of the second hash 236.

In some embodiments, upon the shards 238, 240 identifying that they have respective preimages of the hashes 234, 236, the first shard 238 generates a first identification (ID) tag 242 and the second shard 240 generates a second ID tag 244. In some embodiments, the tags 242, 244 are committed to the blockchain via the atomic commit 252. In some embodiments, either before, after, or simultaneously with the atomic commit 252, the first ID tag 242 is presented to a first user 246 and a second user 248. Further, the second ID tag 244 is presented to the first user 246 and a third user 250.

For example, a transaction for a farmer to deliver crops to a distributor may be split into two hashes. One hash may relate to a transport operator that is to deliver the crops to the distributor, and another hash may relate to the crops to be delivered to the distributor. Before the transaction is initiated, a first shard in a blockchain is sent a preimage of the hash related to the transport operator and a second shard in the blockchain is sent a preimage of the hash related to the crops.

Upon initiation of the transaction by the farmer to the distributor, preimages of both hashes are sent to each shard and the respective shard with the matching preimage generates an identification that is transparent to the farmer and either the transport operator or the distributor. That is, the farmer knows both the transport operator that is being used and the crops being delivered, but the distributor only knows the crops being delivered (as the distributor does not need to know the carrier being used).

Figure 2C:
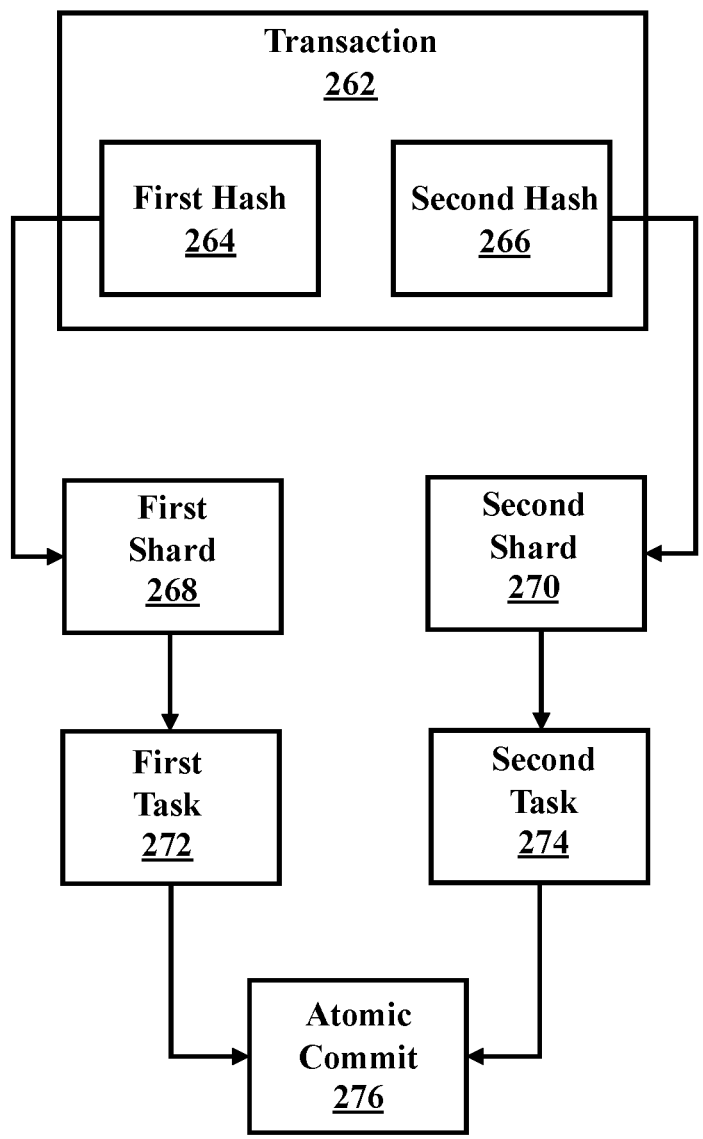
FIG. 2C illustrates a block diagram of an example system for atomically committing a vertical cut transaction to a blockchain network, in accordance with embodiments of the present disclosure.

Referring not to FIG. 2C, illustrated is a block diagram of an example system 260 for atomically committing a vertical cut transaction to a blockchain network, in accordance with embodiments of the present disclosure. It is noted that various descriptions of the system 260 may utilize scenarios or descriptions described above in regard to system 200 of FIG. 2A.

In some embodiments, the system 260 may include a transaction 262, which is split into a first hash 264 and a second hash 266. In some embodiments, preimages (not shown) of each of the hashes 264, 266 may be sent to either a first shard 268, a second shard 270, or both shards 268, 270. As depicted, but in no way limiting, the first shard 268 identifies that it already retains a matching (same) preimage of the first hash 264 as was sent. Further, the second shard 270 identifies that it already retains a matching preimage of the second hash 266.

In some embodiments, upon the first shard 268 identifying that it has a matching preimage that relates to the first hash 264, the first shard 268 performs a first task 272. Further, upon the second shard 270 identifying that it has a matching preimage that relates to the second hash 266, the second shard 270 performs a second task 274. In some embodiments, upon performance of the first task 272 and the second task 274, the atomic commit 276 may be performed.

For example, a transaction for Bob to buy a house from Alice for $100,000 may be submitted to a blockchain network. The transaction may be split into two hashes, a first hash related the ownership transfer of the house from Alice to Bob, and a second hash related to the transfer of the $100,000 from Bob to Alice. In some embodiments, before the transaction is initiated, respective preimages of each hash may be respective sent to a first shard and a second shard. Upon initiation of the transition, both preimages are sent to both the first shard and the second shard and each shard identifies that is has a matching respective preimage. In some embodiments, the first shard includes the preimage associated with the first hash and the first shard performs the task of transferring the house owner from Alice to Bob, further the second shard includes the preimage associated with the second hash and the second shard performs the task of transferring the $100,000 from Bob to Alice.

Figure 3A:
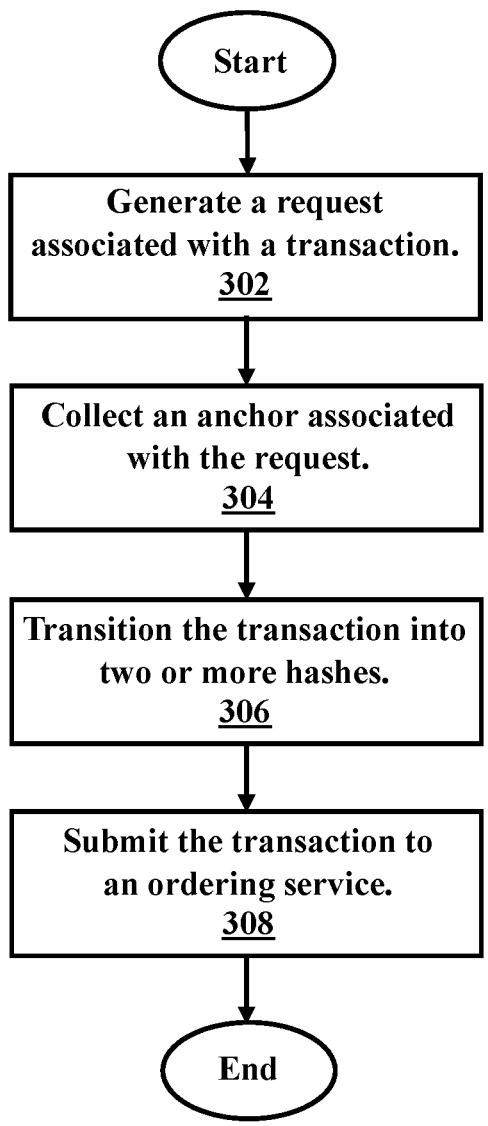
FIG. 3A illustrates a flowchart of an example method for processing a private transaction in a blockchain network, in accordance with embodiments of the present disclosure.

Referring now to FIG. 3A, illustrated is a flowchart of an example method 300 for processing a private transaction in a blockchain network, in accordance with embodiments of the present disclosure. In some embodiments, the method 300 may be performed by a processor (e.g., a node, a computer system, etc.) in a blockchain network.

In some embodiments, the method 300 begins at operation 302, where the processor generates a request associated with a transaction. The method 300 proceeds to operation 304, where the processor collects an anchor associated with the request. In some embodiments, the method 300 proceeds to operation 306, where the processor transitions the transaction into a collection of two or more hashes. The method 300 proceeds to operation 308, where the processor submits the transaction to an ordering service. In some embodiments, the method 300.

Discussed more fully below are further operations that can be implemented by the method 300, but which are not depicted in FIG. 3A. Accordingly, in some embodiments, the request may be a processable action that modifies a blockchain ledger. In some embodiments, the method 300 further proceeds to an operation where the processor validates, by two or more shards in the blockchain network (which may be housed in/on the processor), the transaction. The transaction may be locally (e.g., without visibility by the other shards in the blockchain) validated by the two or more shards.

In some embodiments, the two or more shards validate the transaction by the method 300 further proceeding to having the processor receive, by each of the two or more shards, a respective, known preimage associated with the two or more hashes. The processor matches, by each of the tow or more shards, the respective, known preimage to the two or more hashes.

In some embodiments, the method 300 further proceeds to an operation where the processor performs, by the two or more shards (in/on the processor), an atomic commit of the request. In some embodiments, the atomic commit may be performed without any respective, known preimage being shared with any of the other two or more shards.

Figure 3B:
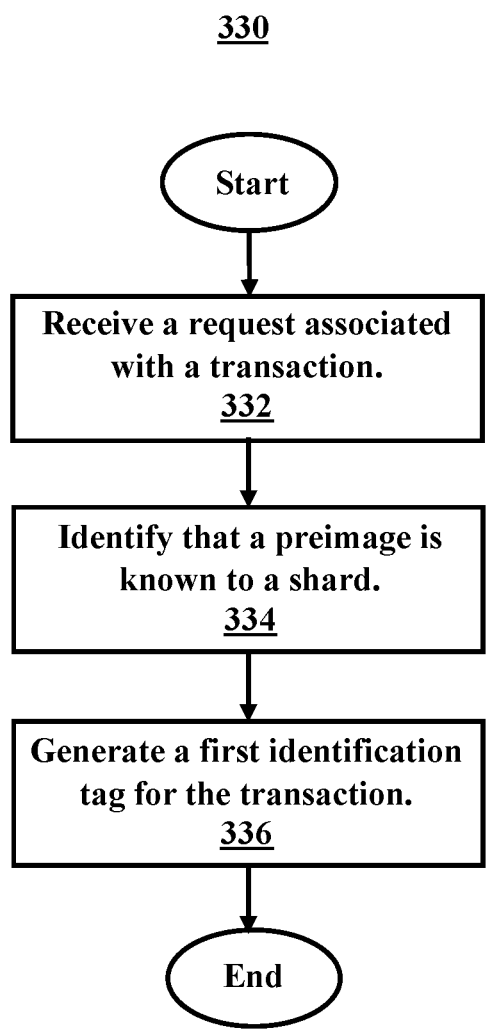
FIG. 3B illustrates a flowchart of a further example method for processing a private transaction in a blockchain network, in accordance with embodiments of the present disclosure.

Referring now to FIG. 3B, illustrated is a flowchart of a further example method 330 for processing a private transaction in a blockchain network, in accordance with embodiments of the present disclosure. In some embodiments, the method 330 may be performed by a processor (e.g., a node, a computer system, etc.) in a blockchain network.

In some embodiments, the method 330 begins at operation 332, where the processor receives a request associated with a transaction. The method 330 proceeds to operation 334, where the processor identifies that a first preimage associated with a first hash is known to a first shard. The method 330 proceeds to operations 336, where the processor generates a first identification tag associated with the transaction. In some embodiments, the method 330 ends.

Discussed more fully below are further operations that can be implemented by the method 330, but which are not depicted in FIG. 3B. Accordingly, in some embodiments, the method 330 further proceeds to an operation where the processor identifies that a second preimage associated with a second hash is known to a second shard. The processor generates a second identification tag associated with the transaction.

In some embodiments, the first identification tag is displayed to a first user and a second user, and the second identification tag is displayed to the first user and third user. In some embodiments, the method 330 further proceeds to an operation where the processor validates the transaction. The processor then commits, atomically, the transaction to the blockchain network.

Figure 3C:
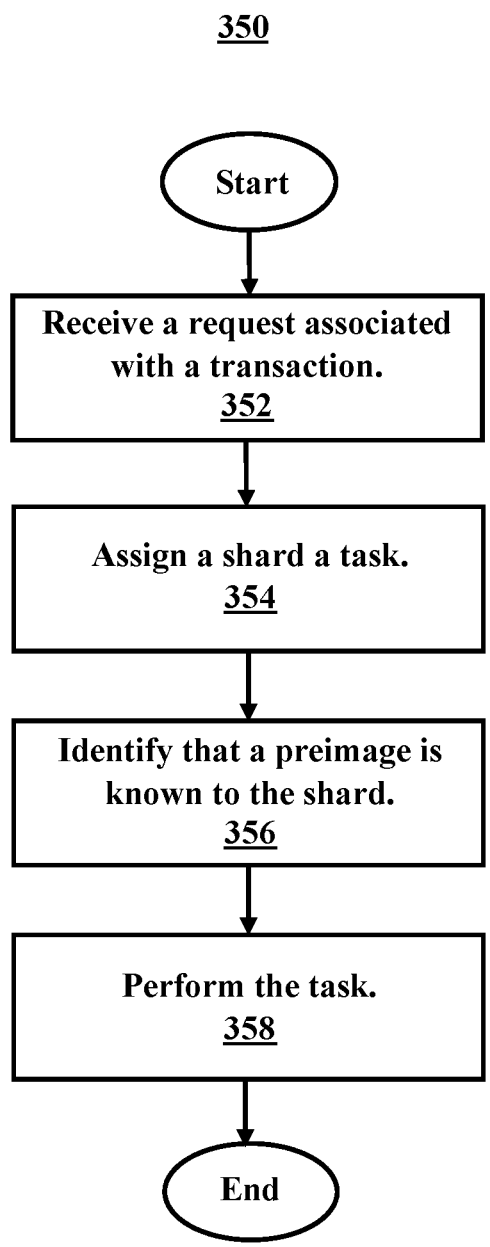
FIG. 3C illustrates a flowchart of another example method for processing a private transaction in a blockchain network, in accordance with embodiments of the present disclosure.

Referring now to FIG. 3C, illustrated is a flowchart of an example method for processing a private transaction in a blockchain network, in accordance with embodiments of the present disclosure. In some embodiments, the method 350 may be performed by a processor (e.g., a node, a computer system, etc.) in a blockchain network.

In some embodiments, the method 350 begins at operation 352, where the processor receives a request associated with a transaction. The method 350 proceeds to operation 354, where the processor assigns a first shard a first task. The method 350 proceeds to operation 356, where the processor identifies that a first preimage associated with a first hash is known to the first shard. The method 350 proceeds to operation 358, where the processor performs the first task. In some embodiments, the method 350 ends.

Discussed more fully below are further operations that can be implemented by the method 350, but which are not depicted in FIG. 3C. Accordingly, in some embodiments, the method 350 further proceeds to an operation where the processor assigns a second shard a second task. The processor identifies that a second preimage associated with a second hash is known to the second shard. The processor performs the second task. In some embodiments, the first task and the second task are performed as a part of an atomic commit of the transaction.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
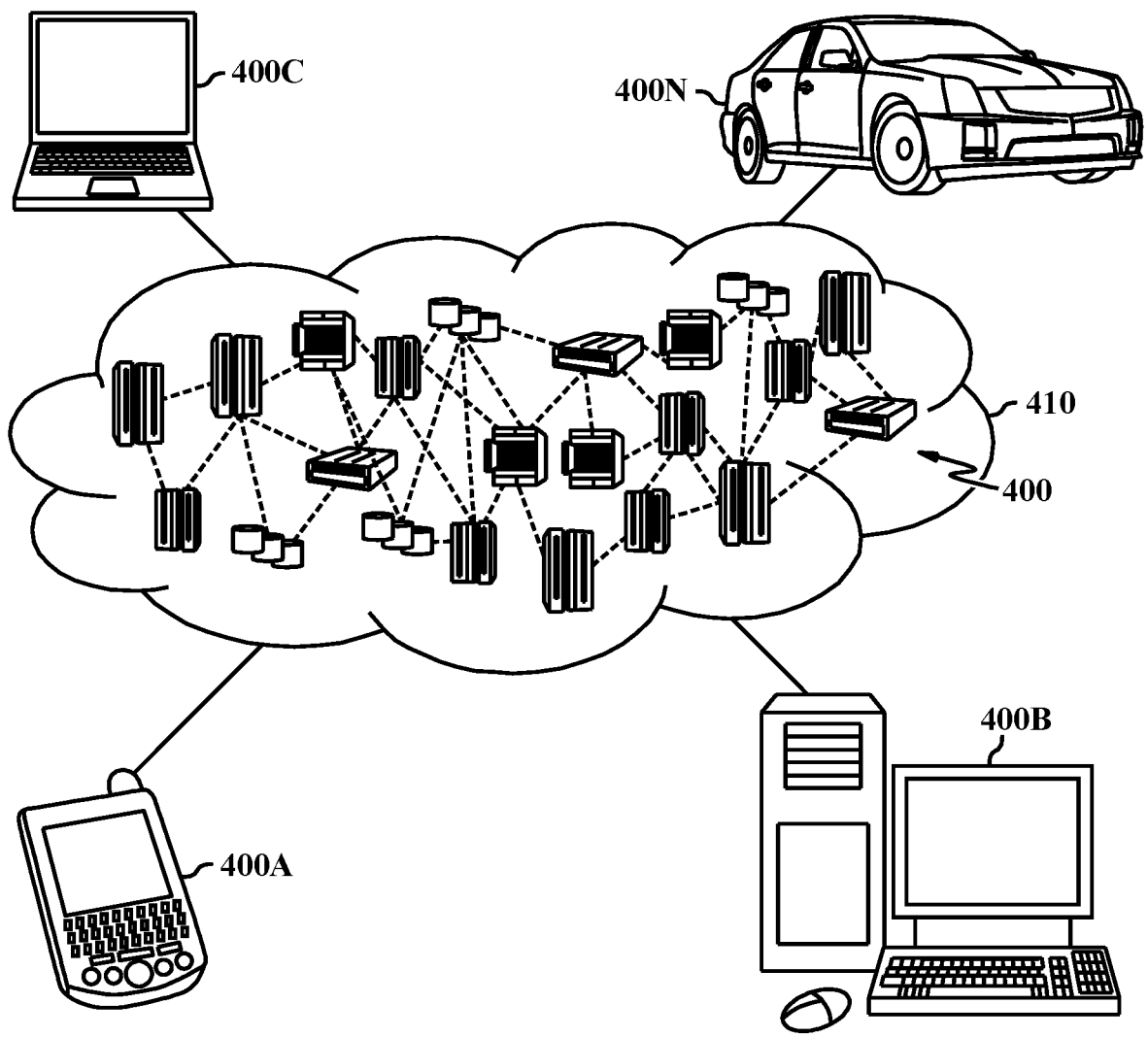
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
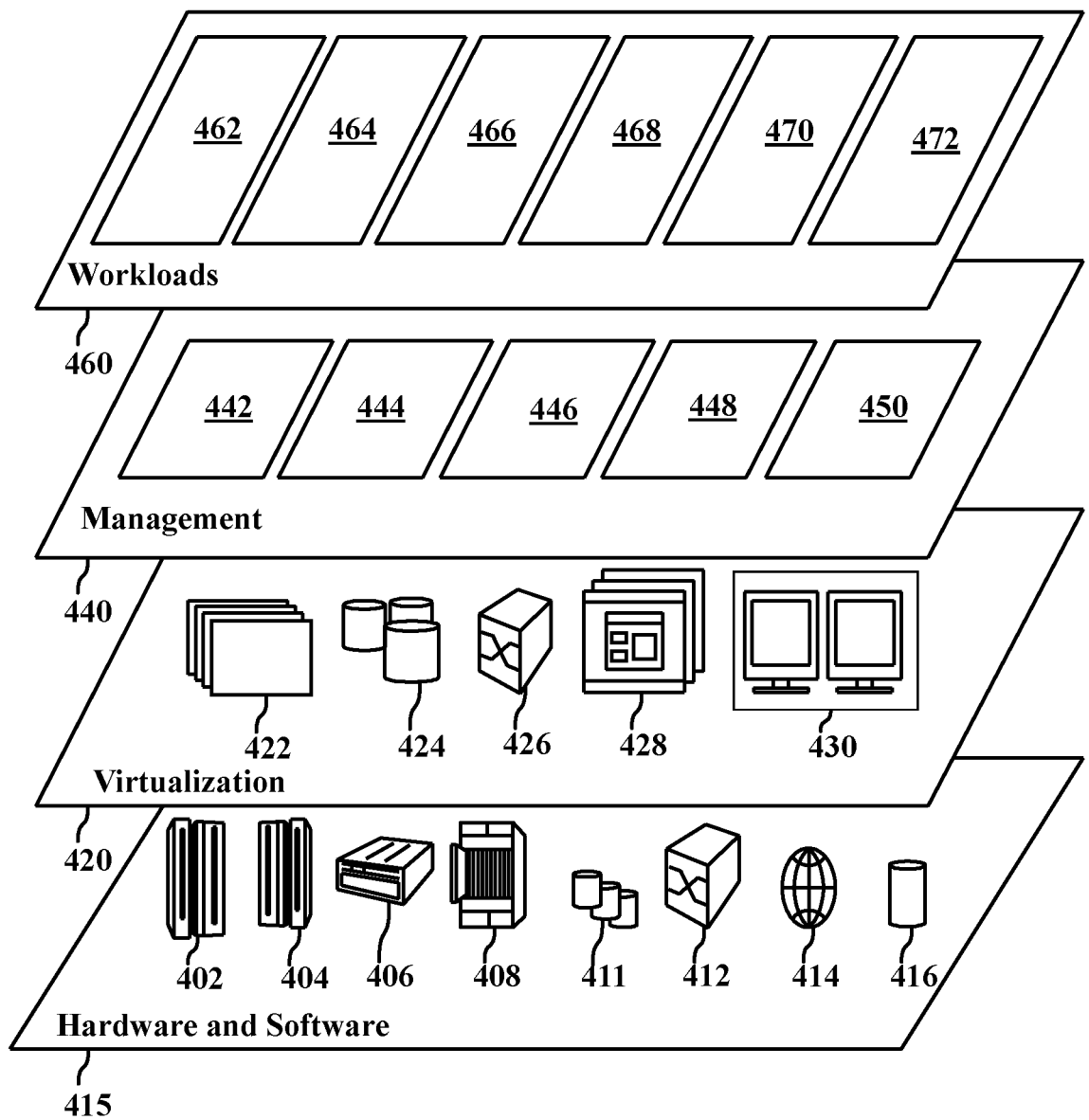
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and atomic committing 472.

Figure 5:
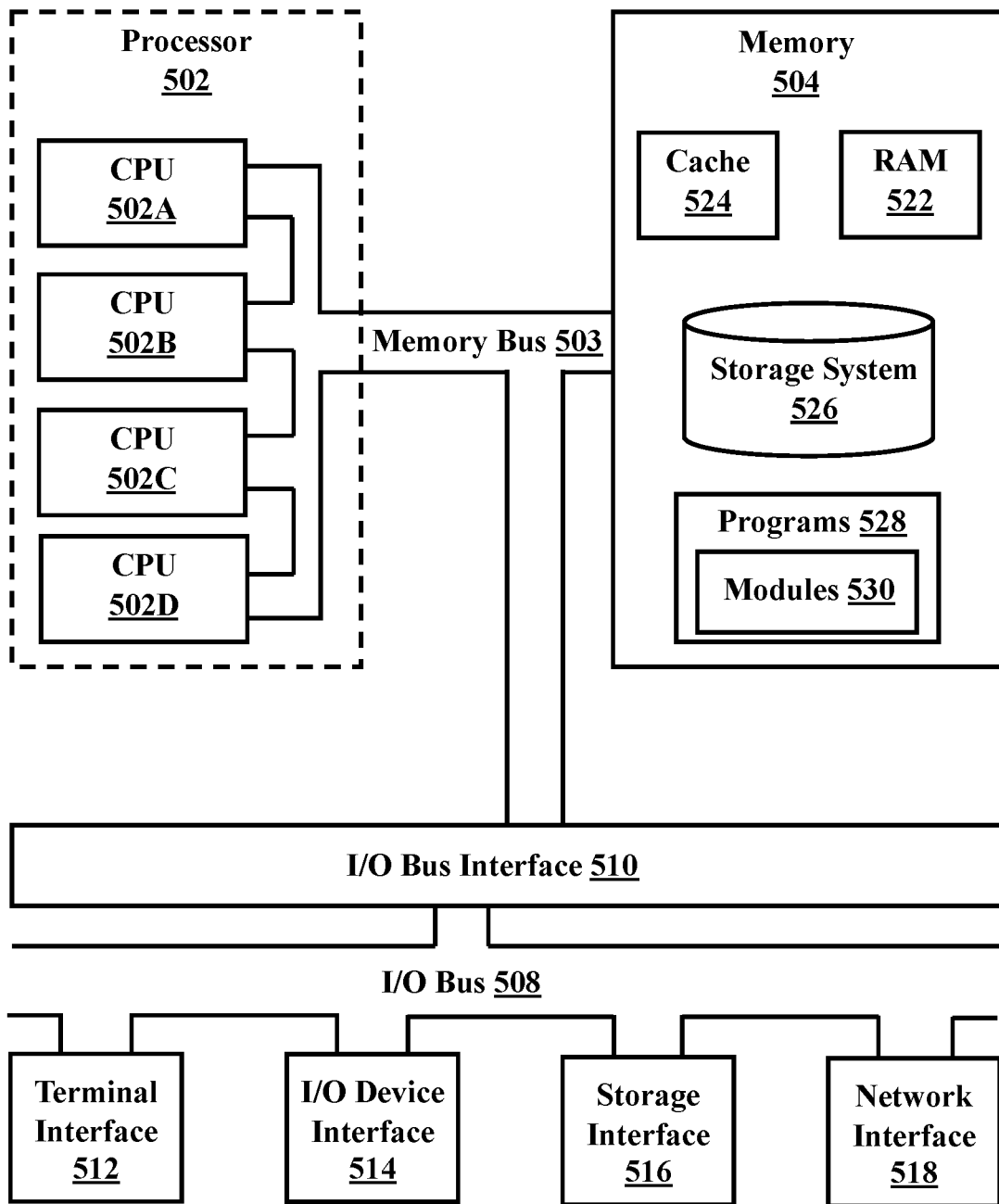
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for processing a private transaction in a blockchain network, the method comprising:
   generating a request associated with a transaction;
   validating the transaction privately, wherein validating the transaction privately prevents other shards from viewing information by storing preimages of hashes in specific shards within a blockchain;
   collecting an anchor associated with the request;
   transitioning the transaction into a collection of two or more hashes; and
   submitting the transaction to an ordering service.

2. The method of claim 1, wherein the request is a processable action that modifies a blockchain ledger.

3. The method of claim 1, wherein the transaction is locally validated by two or more shards in the blockchain network.

4. The method of claim 3, wherein the two or more shards validate the transaction comprising:
   receiving by each of the two or more shards a respective, known preimage associated with the two or more hashes; and
   matching, by each of the two or more shards, the respective, known preimage to the two or more hashes.

5. The method of claim 4, further comprising:
   performing, by the two or more shards, an atomic commit of the request.

6. The method of claim 5, wherein the atomic commit is performed without any respective, known preimage being shared with any of the other two or more shards.

7. A system for processing a private transaction in a blockchain network, the system comprising:
   a memory; and
   a processor in communication with the memory, the processor being configured to perform operations comprising:
   generating a request associated with a transaction;
   validating the transaction privately, wherein validating the transaction privately prevents other shards from viewing information by storing preimages of hashes in specific shards within a blockchain;
   collecting an anchor associated with the request;
   transitioning the transaction into a collection of two or more hashes; and
   submitting the transaction to an ordering service.

8. The system of claim 7, wherein the request is a processable action that modifies a blockchain ledger.

9. The system of claim 7, wherein the transaction is locally validated by two or more shards in the blockchain network.

10. The system of claim 9, wherein the two or more shards validate the transaction comprising:
    receiving by each of the two or more shards a respective, known preimage associated with the two or more hashes; and
    matching, by each of the two or more shards, the respective, known preimage to the two or more hashes.

11. The system of claim 10, wherein the operations further comprise:
    performing, by the two or more shards, an atomic commit on the request.

12. The system of claim 11, wherein the atomic commit is performed without any respective, known preimage being shared with any of the other two or more shards.

13. A computer program product for processing a private transaction in a blockchain network, the computer program product comprising a computer readable storage medium having program instructions embodied therewith, the program instructions executable by a processor to cause the processors to perform a function, the function comprising:
   generating a request associated with a transaction;
   validating the transaction privately, wherein validating the transaction privately prevents other shards from viewing information by storing preimages of hashes in specific shards within a blockchain;
   collecting an anchor associated with the request;
   transitioning the transaction into a collection of two or more hashes; and
   submitting the transaction to an ordering service.

14. The computer program product of claim 13, wherein the request is a processable action that modifies a blockchain ledger.

15. The computer program product of claim 13, wherein the transaction is locally validated by two or more shards in the blockchain network.

16. The computer program product of claim 15, wherein the two or more shards validate the transaction comprising:
    receiving by each of the two or more shards a respective, known preimage associated with the two or more hashes; and
    matching, by each of the two or more shards, the respective, known preimage to the two or more hashes.

17. The computer program product of claim 16, further comprising:
    performing, by the two or more shards, an atomic commit on the request.

18. The computer program product of claim 17, wherein the atomic commit is performed without any respective, known preimage being shared with any of the other two or more shards.

19. A method for processing a private transaction in a blockchain network, the method comprising:
   receiving a request associated with a transaction;
   identifying that a first preimage associated with a first hash is known to a first shard;
   validating the transaction privately using the first shard, wherein validating the transaction privately prevents other shards from viewing information by storing preimages of hashes in specific shards within a blockchain; and
   generating a first identification tag associated with the transaction.

20. The method of claim 19, further comprising:
    identifying that a second preimage associated with a second hash is known to a second shard; and
    generating a second identification tag associated with the transaction.

21. The method of claim 20, wherein the first identification tag is displayed to a first user and a second user, and wherein the second identification tag is displayed to the first user and a third user.

22. The method of claim 21, further comprising:
    committing, atomically, the transaction to the blockchain network.

23. A method for processing a private transaction in a blockchain network, the method comprising:
   receiving a request associated with a transaction;
   assigning a first shard a first task;
   identifying that a first preimage associated with a first hash is known to the first shard;
   validating the transaction privately using the first shard, wherein validating the transaction privately prevents other shards from viewing information by storing preimages of hashes in specific shards within a blockchain; and
   performing the first task.

24. The method of claim 23, further comprising:
   assigning a second shard a second task;
   identifying that a second preimage associated with a second hash is known to the second shard; and
   performing the second task.

25. The method of claim 24, wherein the first task and the second task are performed as a part of an atomic commit of the transaction.

* * * * *